US007433065B2

(12) United States Patent
Phillips et al.

(10) Patent No.: US 7,433,065 B2
(45) Date of Patent: Oct. 7, 2008

(54) IMAGE FORMING DEVICE CONSUMABLE MONITORING METHODS, CONSUMABLE MONITORING SYSTEMS AND IMAGE FORMING DEVICES

(75) Inventors: Quintin Phillips, Boise, ID (US); Jake Heusinkveld, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 892 days.

(21) Appl. No.: 09/932,631

(22) Filed: Aug. 16, 2001

(65) Prior Publication Data

US 2003/0035129 A1    Feb. 20, 2003

(51) Int. Cl.
*H04N 1/327* (2006.01)
*G06F 11/22* (2006.01)
*G06F 15/173* (2006.01)
*G06F 15/177* (2006.01)
*G06K 15/02* (2006.01)

(52) U.S. Cl. .............. 358/1.14; 358/1.15; 358/434; 358/401; 358/406; 358/441; 358/438

(58) Field of Classification Search ............. 358/1.14; 347/7; 399/24, 25, 27, 12, 8
See application file for complete search history.

(56) References Cited

U.S. PATENT DOCUMENTS

| | | | | |
|---|---|---|---|---|
| 5,132,729 A * | 7/1992 | Matsushita et al. | ............ | 399/24 |
| 5,335,048 A * | 8/1994 | Takano et al. | ............ | 399/8 |
| 5,491,540 A | 2/1996 | Hirst | | |
| 5,930,553 A * | 7/1999 | Hirst et al. | ............ | 399/8 |
| 5,956,487 A | 9/1999 | Venkatraman et al. | | |
| 5,959,530 A * | 9/1999 | Lupien et al. | ............ | 340/568.1 |
| 6,130,757 A * | 10/2000 | Yoshida et al. | ............ | 358/1.15 |
| 6,312,106 B1 * | 11/2001 | Walker | ............ | 347/50 |
| 6,325,495 B1 * | 12/2001 | Foth | ............ | 347/84 |
| 6,332,062 B1 * | 12/2001 | Phillips et al. | ............ | 399/12 |
| 6,494,562 B1 * | 12/2002 | Walker et al. | ............ | 347/32 |
| 6,625,402 B2 * | 9/2003 | Takemoto | ............ | 399/8 |
| 6,631,967 B1 * | 10/2003 | Saruta | ............ | 347/19 |
| 6,681,349 B2 * | 1/2004 | Sekizawa | ............ | 714/47 |
| 6,978,255 B1 * | 12/2005 | Pauschinger et al. | ............ | 705/61 |
| 7,099,028 B2 * | 8/2006 | Schneider et al. | ............ | 358/1.15 |
| 7,177,553 B2 * | 2/2007 | Ono | ............ | 399/12 |

(Continued)

FOREIGN PATENT DOCUMENTS

DE    10042914 A1 *    4/2001

(Continued)

*Primary Examiner*—Twyler L. Haskins
*Assistant Examiner*—Myles D Robinson

(57) ABSTRACT

Image forming device consumable monitoring methods, consumable monitoring systems and image forming devices are described. According to one aspect, an image forming device consumable monitoring method includes storing information regarding a plurality of consumables usable by an image forming device to form hard images, wherein the stored information for an individual one of the consumables includes a stored consumable identifier which identifies the respective consumable and a stored party identifier utilized to identify a proper party of the respective consumable; receiving information regarding a consumable to be verified including a received consumable identifier which identifies the consumable to be verified and a received party identifier utilized to identify the proper party associated with the consumable to be verified; comparing the received consumable identifier with at least one of the stored consumable identifiers; and comparing the received party identifier with at least one of the stored party identifiers.

28 Claims, 4 Drawing Sheets

U.S. PATENT DOCUMENTS

| | | |
|---|---|---|
| 7,231,166 B2 * | 6/2007 | Miyaji .................. 399/109 |
| 7,234,061 B1 * | 6/2007 | Diab et al. ............. 713/176 |
| 2001/0019343 A1 * | 9/2001 | Walker et al. ............ 347/19 |
| 2001/0053980 A1 * | 12/2001 | Suliman et al. ............. 705/1 |
| 2002/0002492 A1 * | 1/2002 | Okazawa ................. 705/14 |
| 2002/0077979 A1 * | 6/2002 | Nagata .................. 705/40 |
| 2002/0133425 A1 * | 9/2002 | Pederson et al. .......... 705/26 |
| 2003/0031475 A1 * | 2/2003 | Asakura ................. 399/12 |
| 2003/0059050 A1 * | 3/2003 | Hohberger et al. ........ 380/270 |
| 2003/0069750 A1 * | 4/2003 | Siegel et al. ............. 705/1 |
| 2005/0213997 A1 * | 9/2005 | Yoshizawa ............... 399/24 |
| 2005/0243118 A1 * | 11/2005 | Ward et al. .............. 347/19 |

FOREIGN PATENT DOCUMENTS

JP          2003076230 A  *  3/2003

* cited by examiner

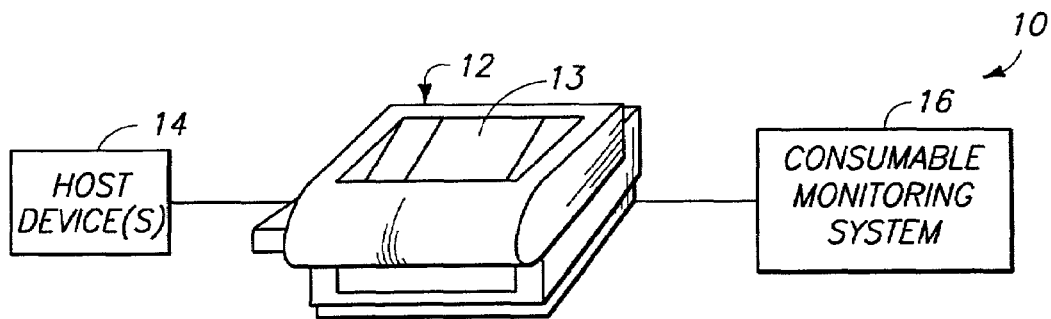
$F_{IL} = \mathbb{1}$
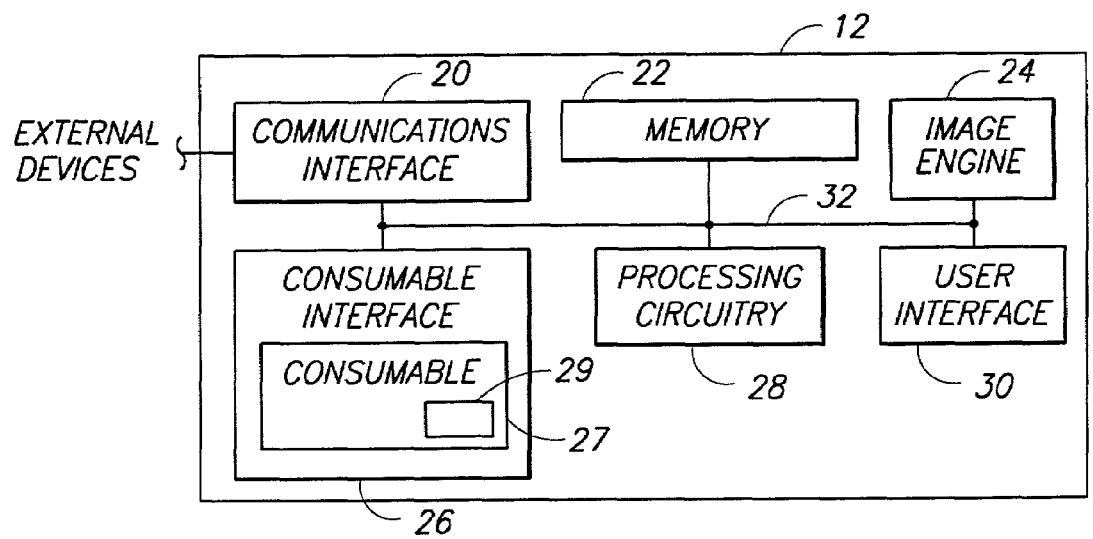
$F_{IL} = \mathbb{2}$
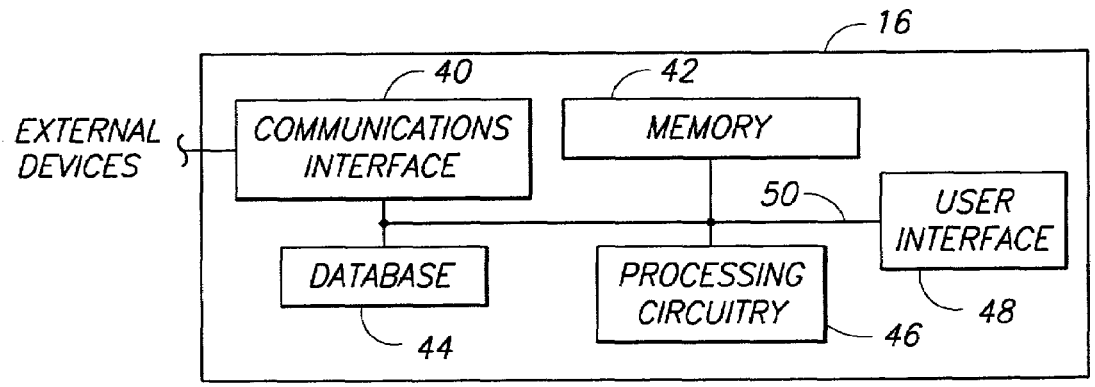
$F_{IL} = \mathbb{3}$

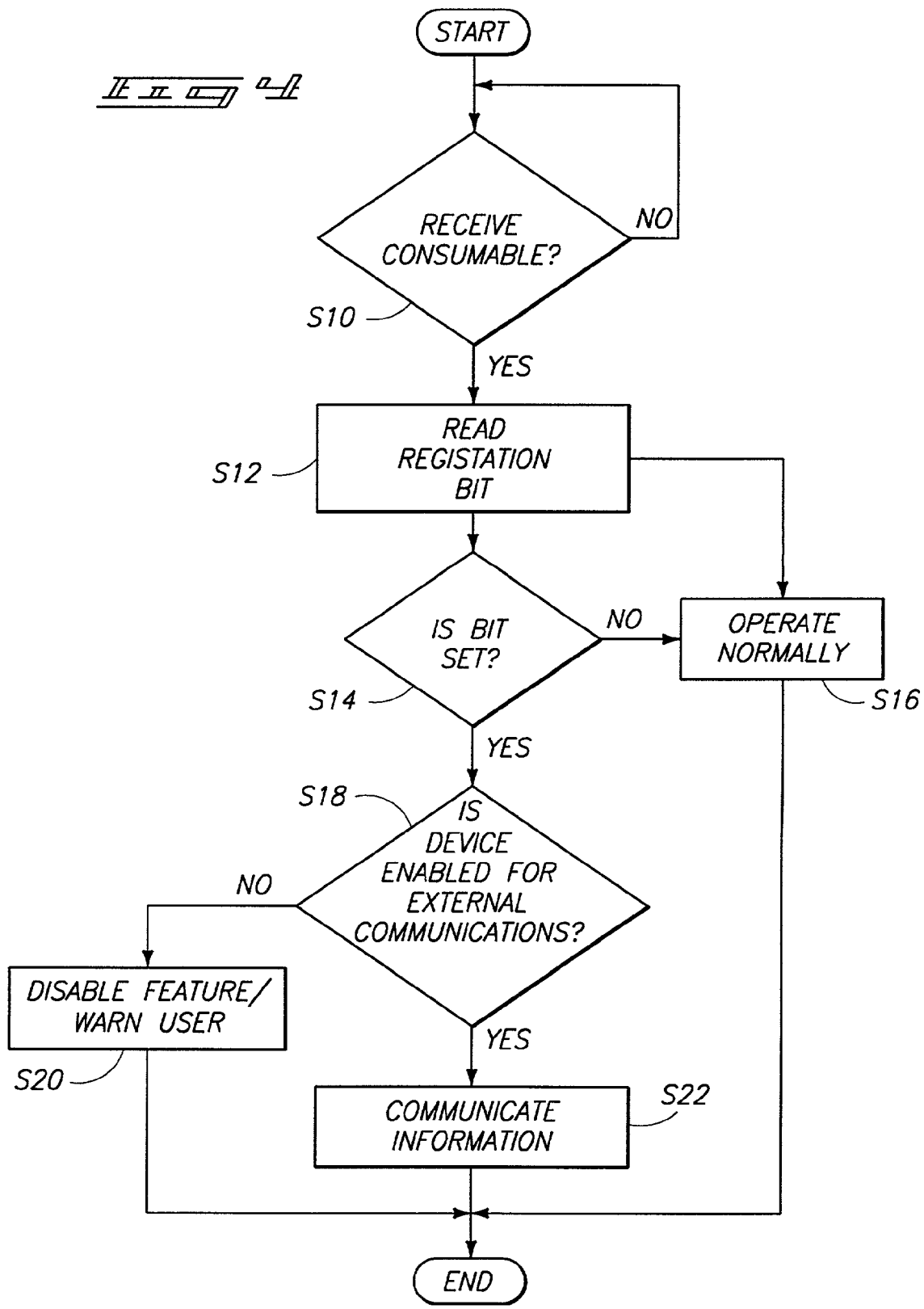

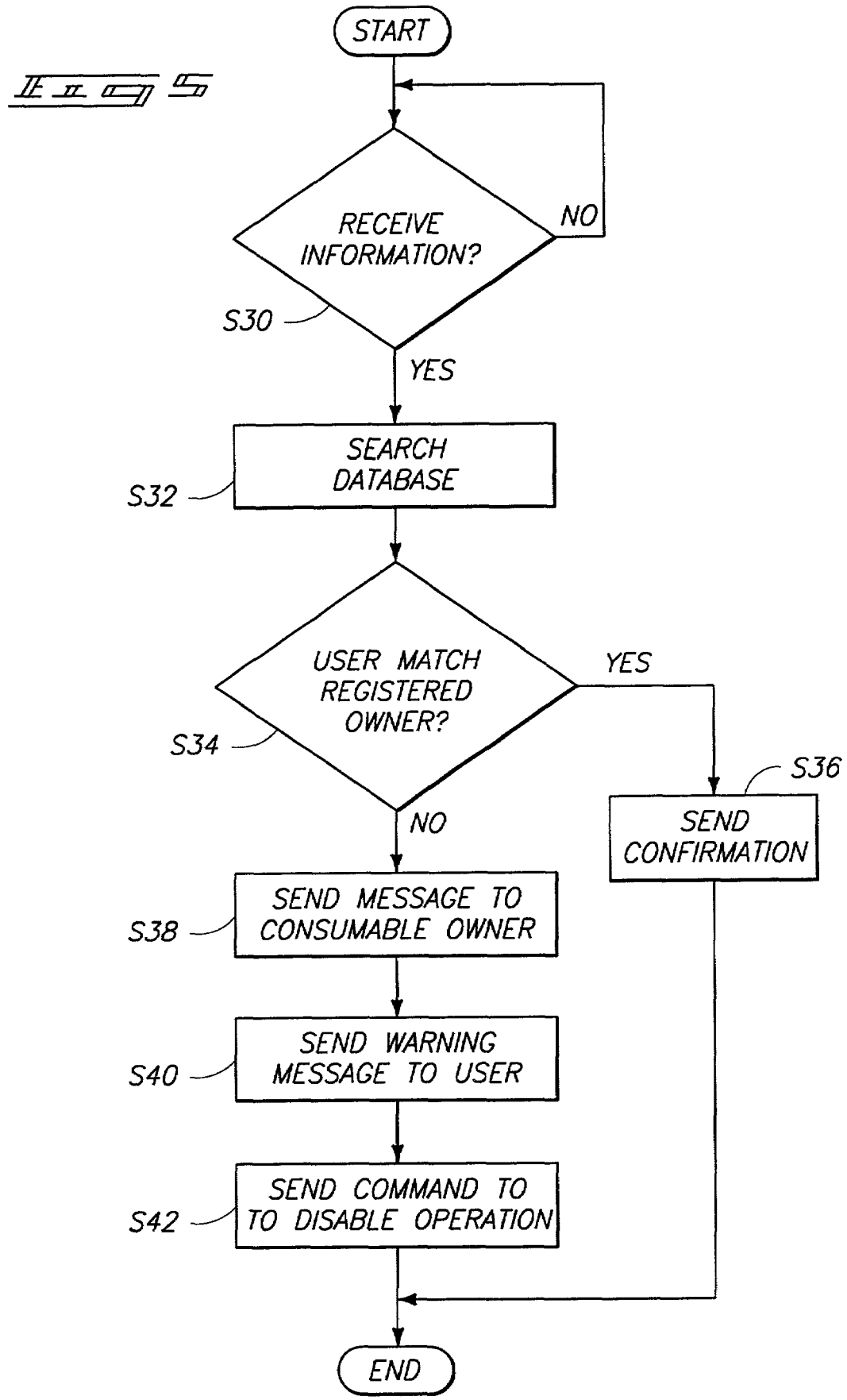

IMAGE FORMING DEVICE CONSUMABLE MONITORING METHODS, CONSUMABLE MONITORING SYSTEMS AND IMAGE FORMING DEVICES

FIELD OF THE INVENTION

The invention relates to image forming device consumable monitoring methods, consumable monitoring systems and image forming devices.

BACKGROUND OF THE INVENTION

The increased usage of imaging devices has resulted in image forming devices having improved capabilities to implement expanded imaging operations. For example, image forming devices such as laser printers can print high-quality hard images including color images.

Image forming devices utilize consumables to form hard images. Exemplary consumables include expendable components which need replacement. The sophistication of consumables, number of consumables, and quality of consumables used by image forming devices have increased as the capabilities of the image forming devices themselves have also increased. Accordingly, some consumables have increased in price as the sophistication has increased.

It has been observed that the consumables are generally difficult to track in conventional arrangements and consumables may be subject to theft or other misappropriation. The consumables are typically not individually significant enough in dollar value wherein misappropriation constitutes a major crime, and it is costly and requires time and resources to adequately monitor consumables using conventional arrangements. However, with some consumables individually costing hundreds of dollars, cumulative misappropriation of such items becomes significant.

There exists a need to provide improved devices and methodologies for monitoring consumables.

SUMMARY OF THE INVENTION

Image forming device consumable monitoring methods, consumable monitoring systems and image forming devices are provided.

According to one aspect, an image forming device consumable monitoring method comprises storing information regarding a plurality of consumables usable by an image forming device to form hard images, wherein the stored information for an individual one of the consumables includes a stored consumable identifier which identifies the respective consumable and a stored party identifier utilized to identify a proper party of the respective consumable; receiving information regarding a consumable to be verified including a received consumable identifier which identifies the consumable to be verified and a received party identifier utilized to identify the proper party associated with the consumable to be verified; comparing the received consumable identifier with at least one of the stored consumable identifiers; and comparing the received party identifier with at least one of the stored party identifiers.

According to another aspect, a consumable monitoring system comprises: a database configured to store information regarding a plurality of consumables usable by an image forming device to form hard images, wherein the stored information for an individual one of the consumables includes a stored consumable identifier which identifies the respective consumable, and a stored party identifier utilized to identify a proper party associated with the respective consumable; an interface adapted to receive information regarding a consumable to be verified including a received consumable identifier which identifies the consumable to be verified and a received party identifier utilized to identify the proper party associated with the consumable to be verified; and processing circuitry configured to compare the received consumable identifier with the stored consumable identifier and to compare the received party identifier with the stored party identifier.

Another aspect provides an image forming device comprising: an image engine configured to use a consumable to form a hard image; processing circuitry coupled with the image engine and configured to formulate an identifier message including an identifier of the image forming device and an identifier of the consumable, and to control communication of the identifier message; and an interface adapted to communicate externally of the image forming device and to communicate the identifier message.

Other aspects are provided herein.

DESCRIPTION OF THE DRAWINGS

FIG. 1 is an illustrative representation of an image forming system.

FIG. 2 is a functional block diagram of components of an exemplary image forming device of the image forming system.

FIG. 3 is a functional block diagram illustrating components of an exemplary consumable monitoring system of the image forming system.

FIG. 4 is a flow chart depicting an exemplary methodology executed by the image forming device.

FIG. 5 is a flow chart depicting an exemplary methodology executed by the consumable monitoring system.

DETAILED DESCRIPTION OF THE INVENTION

Figure 6:
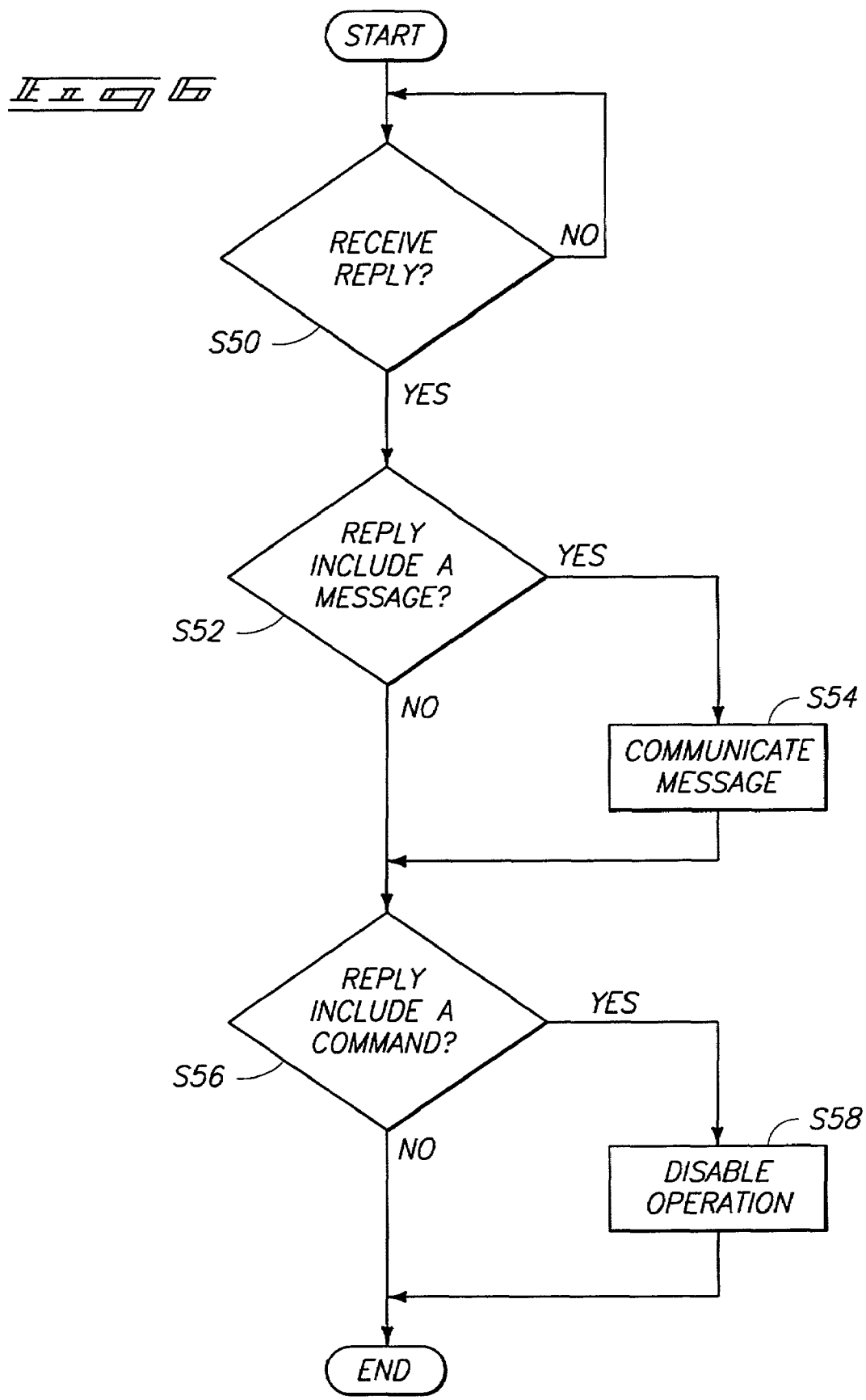
FIG. 6 is a flow chart depicting an exemplary methodology executed by the image forming device following execution of the methodology depicted in FIG. 5 according to aspects of the invention.

FIG. 1 depicts an image forming system 10 including one or more image forming device 12, one or more host device 14, and a consumable monitoring system 16 (only one device 12 and one device 14 are shown). Image forming device 12, host device 14 and consumable monitoring system 16 are configured to communicate with one another via an appropriate communication medium, such as a public network (e.g., the Internet) and\or a private network. For example, devices 12, 14 and system 16 are arranged to implement web communications in one embodiment. In typical arrangements, a plurality of image forming devices 12 and host devices 14 communicate with consumable monitoring system 16.

Image forming device 12 is configured to utilize one or more consumable to form hard images. Exemplary consumables utilized within a given image forming device include imaging media (e.g., paper, transparencies), marking agents (e.g., toner), components having fixed life spans (e.g., developer assembly), and other expendable items utilized to complete desired jobs. Aspects of the present invention allow monitoring and/or tracking of consumables and use thereof as well as notification and messaging operations.

Exemplary image forming devices 12 include printers, facsimile devices, copiers, multiple-function devices or other devices capable of forming hard images upon media 13 comprising paper, labels, transparencies, roll media, etc. Exemplary hard images include images provided upon output media including printed media.

An exemplary host device 14 comprises a personal computer utilizing an Intel™ processor or AMD™ processor (not shown). Host device 14 provides data to be imaged to image forming device 14. In addition, host devices 14 may be associated with a system administrator who modifies the configuration of image forming device 12 or performs other operations. Other host device configurations are possible.

In one exemplary arrangement, consumable monitoring system 16 is implemented as a server configured to store information regarding consumables and proper parties associated with such consumables. Such information permits system 16 to monitor and/or track consumables of image forming system 10. In addition, consumable monitoring system 16 issues warning messages, commands to disable operations of image forming devices 12 and performs other operations discussed in more detail below.

Exemplary proper parties associated with the consumables for whom information is stored in consumable monitoring system 16 include owners of the consumables, purchasers of the consumables, employees of a company who purchased the consumables, or any other party properly entitled to use the respective consumables.

Referring to FIG. 2, components of an exemplary image forming device 12 are illustrated. Some of the depicted components are optional and other arrangements of image forming device 12 configured to form hard images are possible. The exemplary embodiments disclosed herein are discussed with reference to a printer application although the present invention applies to any image forming device configuration capable of forming hard images.

As shown, the exemplary image forming device 12 includes a communications interface 20, a memory 22, an image engine 24, a consumable interface 26, processing circuitry 28, a user interface 30 and a bus 32. Bus 32 is configured to implement communications intermediate the respective coupled components.

Communications interface 20 is configured to couple with a communication medium intermediate host device 14 and consumable monitoring system 16. An exemplary communication interface 20 comprises a network interface card (NIC), modem or other configuration configured to implement external communications with respect to image forming device 12. The illustrated communication medium may be implemented as a private network arrangement or a public network arrangement, such as the Internet, or in another alternative configuration.

Memory 22 stores digital information and instructions usable to control operations within image forming device 12. For example, memory 22 is configured to store image data to be imaged using image engine 24, executable instructions usable by processing circuitry 28 to implement imaging operations and to control operations of image forming device 12, as well as other digital data to be stored within image forming device 12. Memory 22 comprises a hard disk, random access memory (RAM), read only memory (ROM) and/or flash memory in but one exemplary embodiment.

Image engine 24 implements formation of hard images upon media 13. According to aspects of the present invention, image engine 24 is implemented as a print engine. An exemplary print engine includes a developing assembly and a fusing assembly (not shown) to respectively form hard images using developing or marking agents and to affix the developing or marking agents to media 13. Other constructions or embodiments of image engine 24 are possible.

Consumable interface 26 is operable to couple with a consumable 27. For example, in one embodiment, consumable interface 26 is arranged to establish electrical connections for communications of digital data with consumable 27, comprising for example, a toner cartridge. U.S. Pat. No. 5,491,540, incorporated herein by reference, discusses communications between an image forming device and a consumable in one exemplary configuration.

In one example, consumable 27 includes a memory device 29 configured to electrically couple with consumable interface 26 upon insertion of the cartridge into image forming device 12. Processing circuitry 28 reads and writes data with respect to memory device 29 using consumable interface 26. Other configurations of storing and accessing data upon a consumable 27 are possible.

Processing circuitry 28 is configured to execute executable instructions to control operations of image forming device 12 and to implement operations described herein according to aspects of the invention. Processing circuitry 28 is configured to execute executable instructions stored within memory 22 and comprising, for example, software and/or firmware instructions. Exemplary processing circuitry 28 comprises a microprocessor in the described embodiment.

According to aspects of the present invention, processing circuitry 28 is configured to function as an embedded web server to communicate with external devices such as host devices 14 and consumable monitoring system 16 or other external devices as described in U.S. Pat. No. 5,956,487, incorporated herein by reference. Other configurations for implementing external communications are possible.

As described in further detail below, processing circuitry 28 is configured to implement monitoring operations and tracking operations of consumables. According to the described embodiment, image forming device 12 is configured to communicate with consumable monitoring system 16 to implement such monitoring and tracking of consumables.

User interface 30 is implemented as a control panel in the described embodiment to receive user input commands and a display to depict status and other messages pertinent to image forming device 12.

Referring to FIG. 3, components of an exemplary configuration of consumable monitoring system 16 are illustrated. Consumable monitoring system 16 includes a communications interface 40, a memory 42, a database 44, processing circuitry 46, a user interface 48 and a bus 50. Bus 50 is configured to implement communications intermediate the components of consumable monitoring system 16.

Communication interface 40 is configured to communicate with external devices such as one or more image forming device 12 and one or more host device 14. Communication interface 40 can be implemented as a network interface card, modem or other interface to provide exchange of information intermediate consumable monitoring system 16 and devices external of system 16.

Memory 42 may be implemented as random access memory, read only memory, flash memory, and/or a hard disk capable of storing digital data. Memory 42 stores executable instruction which may be utilized by processing circuitry 46 to control operations of consumable monitoring system 16.

Database 44 is configured to store retrievable information with respect to consumables, proper parties entitled to use the consumables and image forming device identifiers of image forming devices associated with the proper parties. Consumable monitoring system 16 may be implemented by a supplier of consumables, manufacturer of consumables, reseller of consumables or other entity capable of maintaining a database of consumables and proper parties associated with respective ones of the consumables. Image forming devices 12 and/or host devices 14 are configured to access database 44 to implement verification operations with respect to consumables in accordance with aspects of the present invention.

Processing circuitry 46 is configured to retrieve executable instructions from memory 42 to control operations of consumable monitoring system 16. For example, when requests are received via communication interface 40 with respect to consumables, processing circuitry 46 is configured to implement search operations of database 44, retrieve results and to forward results to communication interface 40 for communication to an appropriate one or more image forming device 12 and/or host device 14. As described further below, processing circuitry 46 formulates messages, commands or other communications to be applied to one or more image forming device 12 and/or host device 14 according to other aspects of the invention.

Consumable monitoring system 16 includes a user interface 48 in the described embodiment. User interface 48 includes a control panel allowing a user to enter consumable information into database 44. Data to be stored within database 44 may also be received from communications interface 40. Typically, upon purchase of a consumable, information associated with the proper party of the consumable and hardware devices (e.g., image forming devices) of the proper party are associated with the consumable and stored with database 44.

In the described embodiment, consumable monitoring system 16 is implemented as a specific website registry accessible by image forming device 12 and/or host device 14 or other devices. Information is applied to consumable monitoring system 16 for storage and to initiate searching operations of database 44 of consumable monitoring system 16. Consumable monitoring system 16 is configured to communicate search results, messages and commands as described below. Other implementations of consumable monitoring system 16, such as within a private network, are possible.

More specifically, and in accordance with exemplary aspects of the invention to implement consumable monitoring and tracking operations, information regarding a consumable and the proper party thereof are stored in database 44 for future reference. The information may be obtained when the consumable is purchased, delivered, shipped or other moment in time before use of the consumable.

According to aspects of the invention, stored information of database 44 includes the identification of one or more proper party for individual consumables along with information regarding respective ones of the consumables. In one instance, information provided within database 44 for an individual consumable includes a stored consumable identifier (e.g., serial number and model number of the consumable) which identifies the consumable and one or more stored party identifier.

The stored party identifier may be implemented in a variety of formats. For example, one or more stored party identifier may be associated with a single consumable which identifies one or more hardware device (e.g., serial number and model number of the individual image forming device(s)) associated with the proper party and for which the consumable may be utilized according to one arrangement.

Alternatively, the stored party identifier directly identifies the proper party associated with the consumable according to other aspects. Accordingly, image forming devices of the proper party and/or the proper party itself may be stored within database 44 for individual consumables.

Processing circuitry 46 compares information received from external devices with the information stored within database 44 and provides messages and/or commands responsive to the comparison as described further below.

In one arrangement of the present invention, memory device 29 associated with the respective consumable 27 is programmed upon purchase to initiate monitoring and/or tracking operations described herein. Alternatively, all desired consumables are configured to implement monitoring and tracking operations herein. Other arrangements are possible.

Memory device 29 in one arrangement includes a registration field or bit which is set upon purchase or other convenient time indicating information regarding the consumable is provided within consumable monitoring system 16. Setting of the registration bit or field initiates registration functionality as described herein at subsequent moments in time, such as the installation of the consumable within an image forming device 12. Following association of proper parties with respective consumables within database 44, such consumables are typically distributed to consumers. The consumables may be stored with an inventory, immediately utilized within appropriate image forming devices 12, etc. The stored information regarding the consumables is utilized to track and monitor usage of the consumables.

According to embodiments of the present invention, processing circuitry 28 is configured to monitor for appropriate triggering events for initiating verification operations. An exemplary triggering event is the insertion of a consumable 27 into image forming device 12. Upon detection of insertion of the consumable 27 or other desired convenient triggering event, processing circuitry 28 checks the registration bit or field of memory device 29 to determine whether information regarding the consumable is stored within consumable monitoring system 16 and accordingly whether verification operations of consumable 27 should be initiated.

If the registration bit or field is set, processing circuitry 28 formulates an identifier message which includes information which is compared against information in database 44. The formulated identifier message includes a party identifier and a consumable identifier for utilization within system 16 and comparison against information within database 44. The consumable identifier identifies the consumable 27 received within the image forming device 112.

The party identifier comprises information in one or more format depending upon the arrangement of image forming system 10 and such information is utilized to determine whether the proper party is associated with or using the consumable 27. In one instance, the party identifier includes an identifier of the image forming device 12 receiving the consumable 27. In addition to or in another instance, processing circuitry 28 configures the party identifier to directly identify the party associated with the image forming device 12 which received consumable 27.

Identifier messages communicated to consumable monitoring system 16 according to some aspects of the invention include dates and times of installation of consumable 27 or other appropriate triggering event. Processing circuitry 28 communicates the identifier message to consumable monitoring system 16 upon detection of desired triggering events.

Processing circuitry 28 forwards formulated identifier messages to communications interface 20 for communication of the identifier message externally of image forming device 12 to consumable monitoring system 16 or other destination.

Consumable monitoring system 16 is configured to receive information regarding the consumable to be verified and as identified within the communicated identifier message. The received identifier message includes the consumable identifier, referred to herein as a received consumable identifier, which identifies the appropriate consumable to be verified. The received identifier message also includes the party identifier, referred to herein as the received party identifier, which is utilized to identify the proper party of the respective consumable, either directly or image forming devices associated with the proper party.

Upon receipt of the identifier message within communications interface 40, processing circuitry 46 is configured to search database 44 utilizing the received consumable identifier and the received party identifier. Consumable 27 having the registration bit or other field set indicates that appropriate identifier information for the respective consumable including consumable information, proper parties, and\or image forming device information is stored within database 44.

Processing circuitry 46 compares the received consumable identifier with stored consumable identifiers within database 44. Accordingly, consumables identified within identifier messages received within consumable monitoring system 16 should have corresponding information located within database 44 inasmuch as registration bits are utilized to control the issuance of such messages using the appropriate image forming device 12 and/or host devices 14. If the consumable identified within the message is not found within database 44, processing circuitry 46 is configured in one arrangement to communicate an error message or other status to the appropriate image forming device 12 and/or host device 14.

Upon successful identification of the consumable within database 44 using the received consumable identifier, processing circuitry 46 compares the received party identifier with one or more stored party identifier associated with the identified consumable. For some entities, a plurality of stored device identifiers which identify a plurality of respective image forming devices associated with the appropriate proper party of the consumable may be stored within database 44. In one instance, processing circuitry 46 compares the received party identifier with one or more stored party identifier identifying one or more image forming device of the proper party associated with the consumable if the received party identifier identifies the image forming device which communicated the identifier message. Such operations are useful in arrangements, such as corporations, wherein the proper party may have a plurality of image forming devices 12, any of which may properly use the consumable 27.

Alternatively, or in addition, processing circuitry 46 compares the received party identifier directly with stored party identifiers if the received party identifier directly identifies the proper party. An exemplary direct party identifier identifies the name of the corporation or other proper party of the consumable.

Responsive to the comparison operations, processing circuitry 46 implements one or more operation. For example, if the received party identifier matches at least one of the stored party identifiers within database 44 for the consumable, processing circuitry 46 formulates and forwards a message to the proper party of the respective identified consumable indicating proper usage of the consumable. Such indication may be utilized to monitor usage or for other purposes.

If the comparison results in the received party identifier of the consumable not matching the stored party identifiers within database 44, processing circuitry 46 formulates and communicates messages and/or commands according to aspects of the invention. For example, processing circuitry 46 forwards a command to image forming device 12 identified as coupled or associated with consumable 27 to disable at least one operation of the image forming device 12. Such image forming device 12 is configured to recognize the command and implement the disablement of operations included in the command such as locking operational components of image forming device 12 including for example the developing assembly, fusing assembly, etc.

According to other aspects of the invention, processing circuitry 46 formulates and communicates a warning message to image forming device 12 coupled with the consumable 27 responsive to the comparison operations. Image forming device 12 may include appropriate executable instructions to cause automatic generation of the warning message upon receipt from consumable monitoring system 16. Image forming device 12 may form the warning message upon media 13, the appropriate user interface 30, or communicate the warning message to a host device 14. Such messages are intended to deter future misappropriation conduct and perhaps initiate return of the consumable to the proper party. In addition, operations of device 12 may be rendered inoperable if the consumable monitoring system 16 communicates an appropriate command as described above.

Messages may also be communicated to a host device 14 associated with the proper party to indicate the failure of the verification process and to identify the image forming device 12 using the received party identifier which identifies the device and/or party which communicated the identifier message. Thereafter, the proper party may initiate investigations into the misappropriation.

According to additional aspects of the present invention, processing circuitry 46 may record the date and time information included in the identifier message and/or record the date and time of reception of the received information within memory 42 of consumable monitoring system 16. Information regarding the stored and/or received party identifiers, stored and/or received consumable identifiers, proper party information, and/or date and time information may be utilized to maintain a log for future reference within consumable monitoring system 16.

Referring to FIGS. 4-6, exemplary methodologies are depicted. Processing circuitry 28 of image forming device 12 executes the methodologies of FIGS. 4 and 6 while processing circuitry 46 of consumable monitoring system 16 executes the methodology of FIG. 5 in the described embodiment. Other methods embodying aspects according to the invention are possible. In addition, some steps depicted in FIGS. 4-6 may be omitted according to other methods of the invention.

Referring specifically to FIG. 4, processing circuitry 28 monitors for the coupling of a consumable 27 with consumable interface 26. Other triggering events may be utilized or monitored. Processing circuitry 28 idles at step S10 or performs other operations until a consumable is detected.

Upon detection of the consumable or other appropriate event in step S10, processing circuitry proceeds to step S12 to read a registration bit or field within memory device 29 of consumable 27.

At a step S14, processing circuitry 28 determines whether the registration bit is set.

If the condition of step S14 is negative, processing circuitry 28 proceeds to a step S16 to operate normally and process jobs to be imaged inasmuch as the consumable is not registered.

If the condition of step S14 is affirmative, processing circuitry proceeds to a step S18 to determine whether the respective image forming device 12 is enabled for external communications.

If the condition of step S18 is negative, processing circuitry 28 proceeds to a step S20 to disable one or more imaging feature according to aspects of the present invention. Alternative functionality may be implemented such as generation of warning messages upon media, etc. at step S20 inasmuch as a registered consumable is being utilized in an image forming device unable to communicate with consumable monitoring system 16.

If the condition of step S18 is affirmative, processing circuitry 28 proceeds to a step S22 to communicate an appropriate identifier message utilized within consumable monitoring system 16 for monitoring and/or tracking operations.

Referring to FIG. 5, initially at a step S30, processing circuitry 46 of consumable monitoring system 16 monitors for the reception of information or other appropriate identifier message from one or more image forming device 12. Processing circuitry 46 idles at step S30 or performs other operations until appropriate information or an appropriate message is received.

At step S32, processing circuitry 46 proceeds to search database 44 utilizing identifier information including a consumable identifier and a party identifier received at step S30.

At step S34, processing circuitry 46 analyzes retrieved data from database 44. According to aspects of the invention, processing circuitry 46 attempts to match information of the identifier message with stored information of database 44. For example, processing circuitry 46 compares a received consumable identifier with the stored consumable identifiers. Thereafter, processing circuitry 46 attempts to match the received party identifier with a stored party identifier associated with the identified consumable and a proper party of the identified consumable. Other comparison operations are possible including for example, first searching database 44 using party identifier information and thereafter using the consumable identifier information.

If the condition of step S34 is affirmative, processing circuitry 46 is configured to generate and send a confirmation message at a step S36 to the appropriate image forming device 12 and/or host device 14.

If the condition of step S34 is negative, processing circuitry 46 proceeds to a step S38 to formulate and send a message to the proper party of the respective consumable indicating the failure to match the consumable 27 with the appropriate party. The message may also include identification information of the device which communicated the message identifier and which includes the installed consumable 27.

At step S40, processing circuitry 46 is configured to generate and send a warning message to the respective image forming device 12 and/or host device 14 associated with image forming device 12 wherein the consumable has been utilized.

At step S42, processing circuitry 46 formulates and communicates a command to image forming device 12 and/or the appropriate host device 14 to disable an imaging operation of the image forming device 12.

Referring to FIG. 6, processing circuitry 28 monitors for the reception of a reply at a step S50 from consumable monitoring system 16. Processing circuitry 28 idles at step S50 or performs other operations until an appropriate reply is received.

Once an appropriate reply is received at step S50, processing circuitry 28 proceeds to a step S52 to determine whether the reply from consumable monitoring system 16 includes a message.

If the condition of step S52 is affirmative, processing circuitry 46 proceeds to a step S54 to communicate the received message using image engine 24, user interface 30 or other appropriate device.

After executing step S50, or if the condition of step S52 is negative, processing circuitry 28 proceeds to a step S56 to determine whether the reply includes a command.

If the condition of step S56 is affirmative, processing circuitry 28 proceeds to a step S58 to disable imaging operations within image forming device 12 as specified within the command.

The protection sought is not to be limited to the disclosed embodiments, which are given by way of example only, but instead is to be limited only by the scope of the appended claims.

What is claimed is:

1. An image forming device consumable monitoring method comprising:
    storing information regarding a plurality of consumables usable to form hard images, wherein the stored information for an individual one of the consumables includes a stored consumable identifier which identifies the respective consumable and a stored party identifier utilized to identify a proper party of the respective consumable;
    receiving information regarding a consumable to be verified including a received consumable identifier which identifies the consumable to be verified and a received party identifier utilized to identify the proper party associated with the consumable to be verified;
    comparing the received consumable identifier with at least one of the stored consumable identifiers;
    comparing the received party identifier with at least one of the stored party identifiers;
    outputting a message responsive to the comparings to indicate use of the consumable to be verified by an unauthorized party who is not authorized to use the consumable; and
    wherein the comparing the received consumable identifier comprises comparing the received consumable identifier with at least one of the stored consumable identifiers, further comprising matching the received consumable identifier with one of the stored consumable identifiers, and wherein the comparing the received party identifier comprises comparing after the matching.

2. The method of claim 1 further comprising forwarding a command to an image forming device coupled with the consumable to be verified to disable at least one operation of the image forming device coupled with the consumable to be verified responsive to the comparings.

3. The method of claim 1 further comprising forwarding another message comprising a warning message to an image forming device coupled with the consumable to be verified responsive to the comparings.

4. The method of claim 1 further comprising recording the received consumable identifier, the received party identifier, and date and time information regarding the reception of the received information.

5. The method of claim 1 wherein the receiving the received party identifier comprises receiving a received device identifier which identities the image forming device which communicated the information and wherein the storing comprises storing the stored party identifier comprising at least one stored device identifier which identifies an image forming device associated with the proper party for the respective consumable and wherein the comparing the received party identifier comprises comparing the received device identifier with the stored device identifier.

6. The method of claim 5 wherein the storing the stored party identifier comprises storing a plurality of stored device identifiers and the comparing the received party identifier comprises comparing the received device identifier with the plurality of stored device identifiers.

7. The method of claim 1 wherein the receiving the received party identifier comprises receiving the received party identifier which directly identifies the proper party of the respective consumable.

8. The method of claim 1 wherein the outputting comprises outputting the message to an owner of the respective consumable.

9. The method of claim 1 wherein the comparing the received consumable identifier occurs before the comparing the received party identifier and the outputting comprises outputting the message responsive to the received consumable identifier matching at least one of the stored consumable identifiers and the received party identifier failing to match a stored party identifier of the respective consumable associated with the at least one stored consumable identifier.

10. The method of claim 9 further comprising, using the received consumable identifier, identifying the at least one stored party identifier to be used for the comparing with the received party identifier.

11. The method of claim 1 wherein the message indicates the failure of the received party identifier to match any stored party identifier associated with the consumable to be verified.

12. The method of claim 1 further comprising identifying one of the stored party identifiers as corresponding to the matched one of the stored consumable identifiers, and the comparing the received party identifier comprises comparing with the identified one stored party identifier.

13. The method of claim 12 wherein the outputting comprises outputting responsive to the received party identifier not matching the identified one stored party identifier.

14. The method of claim 1 wherein the proper party is entitled to use the consumable to be verified and the unauthorized party is a party different than the proper party.

15. A consumable monitoring system comprising:
a database configured to store information regarding a plurality of consumables usable to form hard images, wherein the stored information for an individual one of the consumables includes a stored consumable identifier which identifies the respective consumable, and a stored party identifier utilized to identify a proper party associated with the respective consumable;
an interface adapted to receive information regarding a consumable to be verified including a received consumable identifier which identifies the consumable to be verified and a received party identifier utilized to identify the proper party associated with the consumable to be verified;
processing circuitry configured to compare the received consumable identifier with the stored consumable identifiers and to compare the received party identifier with the stored party identifier of a respective one of the consumables corresponding to the received consumable identifier;
wherein the processing circuitry is configured to control outputting of a communication responsive to the received party identifier not matching the stored party identifier of the respective consumable and wherein the communication indicates the failure of the received party identifier to match the stored party identifier of the respective consumable; and
wherein the processing circuitry is configured to compare the received consumable identifier with the stored consumable identifiers before the comparison of the received party identifier with the stored party identifier.

16. The system of claim 15 wherein the processing circuitry is configured to forward the communication comprising a message to the proper party associated with the respective consumable responsive to the comparisons.

17. The system of claim 15 wherein the processing circuitry is configured to forward the communication comprising a command to disable at least one operation of an image forming device coupled with the consumable to be verified responsive to the comparison.

18. The system of claim 15 wherein the processing circuitry is configured to forward the communication comprising a warning message to an image forming device coupled with the consumable to be verified responsive to the comparison.

19. The system of claim 15 further comprising a memory device, and wherein the processing circuitry is configured to forward the received consumable identifier, the received party identifier, and date and time information regarding the reception of the received consumable identifier and the received party identifier to the memory device for storage.

20. The system of claim 15 wherein the interface is adapted to receive the information regarding the consumable to be verified including the received party identifier comprising a received device identifier which identifies the image forming device which communicated the information and wherein the database is configured to store the stored party identifiers comprising at least one stored device identifier which identifies an image forming device associated with the proper party for the respective consumable and wherein the processing circuitry is configured to compare the received device identifier with the stored device identifier to compare the received party identifier with the stored party identifier.

21. The system of claim 15 wherein the database is configured to store the stored party identifier comprising a plurality of stored device identifiers which identify a plurality of image forming devices associated with the proper party of the respective consumable, and wherein the processing circuitry is configured to compare the received party identifier comprising a received device identifier with the stored device identifiers.

22. The system of claim 15 wherein the interface is adapted to receive the information regarding the consumable to be verified including the received party identifier which directly identifies the proper party of the respective consumable.

23. The system of claim 15 wherein the communication indicates use of the consumable to be verified by an unauthorized party.

24. The system of claim 23 wherein the processing circuitry is configured to address the communication for communication to the proper party and to control outputting of another communication comprising a warning message of unauthorized use to an image forming device coupled with the consumable to be verified.

25. The system of claim 15 wherein the non-matching received party identifier and the stored party identifier identify different parties.

26. The system of claim 15 wherein the processing circuitry is configured to communicate the communication to the proper party and wherein the communication comprises the received party identifier corresponding to an unauthorized party different than the proper party.

27. An image forming device consumable monitoring method comprising:
storing information regarding a plurality of consumables usable to form hard images, wherein the stored information for an individual one of the consumables includes a stored consumable identifier which identifies the respective consumable and a stored party identifier utilized to identify a proper party of the respective consumable;

receiving information regarding a consumable to be verified including a received consumable identifier which identifies the consumable to be verified and a received party identifier utilized to identify the proper party associated with the consumable to be verified;

comparing the received consumable identifier with at least one of the stored consumable identifiers;

comparing the received party identifier with at least one of the stored party identifiers;

outputting a message responsive to the comparings to indicate use of the consumable to be verified by an unauthorized party who is not authorized to use the consumable; and wherein the comparing the received consumable identifier occurs before the comparing the received party identifier and the outputting comprises outputting the message responsive to the received consumable identifier matching at least one of the stored consumable identifiers and the received party identifier failing to match a stored party identifier of the respective consumable associated with the at least one stored consumable identifier.

28. The method of claim 27 further comprising, using the received consumable identifier, identifying the at least one stored party identifier to be used for the comparing with the received party identifier.

* * * * *

UNITED STATES PATENT AND TRADEMARK OFFICE
CERTIFICATE OF CORRECTION

PATENT NO. : 7,433,065 B2  Page 1 of 1
APPLICATION NO. : 09/932631
DATED : October 7, 2008
INVENTOR(S) : Quintin Phillips et al.

It is certified that error appears in the above-identified patent and that said Letters Patent is hereby corrected as shown below:

In column 10, line 55, in Claim 5, delete "identities" and insert -- identifies --, therefor.

Signed and Sealed this

Eleventh Day of August, 2009

David J. Kappos
*Director of the United States Patent and Trademark Office*